(12) United States Patent
Bouvet et al.

(10) Patent No.: US 11,212,194 B2
(45) Date of Patent: Dec. 28, 2021

(54) METHOD FOR NEGOTIATING A QUALITY OF SERVICE OFFERED BY A GATEWAY TO TERMINALS

(71) Applicant: ORANGE, Paris (FR)

(72) Inventors: Bertrand Bouvet, Chatillon (FR); Stephane Boizard, Chatillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/341,017

(22) PCT Filed: Oct. 11, 2017

(86) PCT No.: PCT/FR2017/052791
§ 371 (c)(1),
(2) Date: Apr. 10, 2019

(87) PCT Pub. No.: WO2018/069643
PCT Pub. Date: Apr. 19, 2018

(65) Prior Publication Data
US 2020/0186439 A1    Jun. 11, 2020

(30) Foreign Application Priority Data

Oct. 11, 2016    (FR) ........................................ 1659791
Oct. 11, 2017    (WO) ........................ PCT/2017/052791

(51) Int. Cl.
*H04L 12/24*    (2006.01)
*H04L 12/66*    (2006.01)
*H04L 29/12*    (2006.01)

(52) U.S. Cl.
CPC .......... *H04L 41/5006* (2013.01); *H04L 12/66* (2013.01); *H04L 41/0806* (2013.01); *H04L 41/12* (2013.01); *H04L 61/2015* (2013.01)

(58) Field of Classification Search
CPC . H04L 41/5006; H04L 12/66; H04L 41/0806; H04L 41/12; H04L 61/2015
See application file for complete search history.

(56) References Cited

U.S. PATENT DOCUMENTS

| | | | | |
|---|---|---|---|---|
| 6,223,222 | B1 * | 4/2001 | Fijolek | H04L 12/2801 |
| | | | | 348/E7.071 |
| 6,577,628 | B1 * | 6/2003 | Hejza | H04L 12/2856 |
| | | | | 370/392 |

(Continued)

FOREIGN PATENT DOCUMENTS

| | | | | |
|---|---|---|---|---|
| EP | 2790386 | A1 | 1/2014 | |
| EP | 2790386 | A1 * | 10/2014 | .......... H04L 47/805 |

OTHER PUBLICATIONS

The Written Opinion for the International Application No. PCT/FR2017/052791.

(Continued)

*Primary Examiner* — Benjamin H Elliott, IV
(74) *Attorney, Agent, or Firm* — Haverstock & Owens LLP

(57) ABSTRACT

The invention relates to a method for configuring a quality of service by way of a gateway including an interface on a local area network and an interface on a wide area network for a terminal of the local area network to access the wide area network, following the reception, by the gateway, of a network discovery message transmitted by the terminal, the method being noteworthy in that it comprises the steps of associating at least one address of the gateway on the local area network with a particular quality of service setting of the gateway, sending a network attachment offer message to the terminal, the message comprising at least one address of the gateway associated with a particular setting of the quality of service, and, upon reception of a message from the terminal and destined for an address of the gateway, pro- (Continued)

Figure 1:
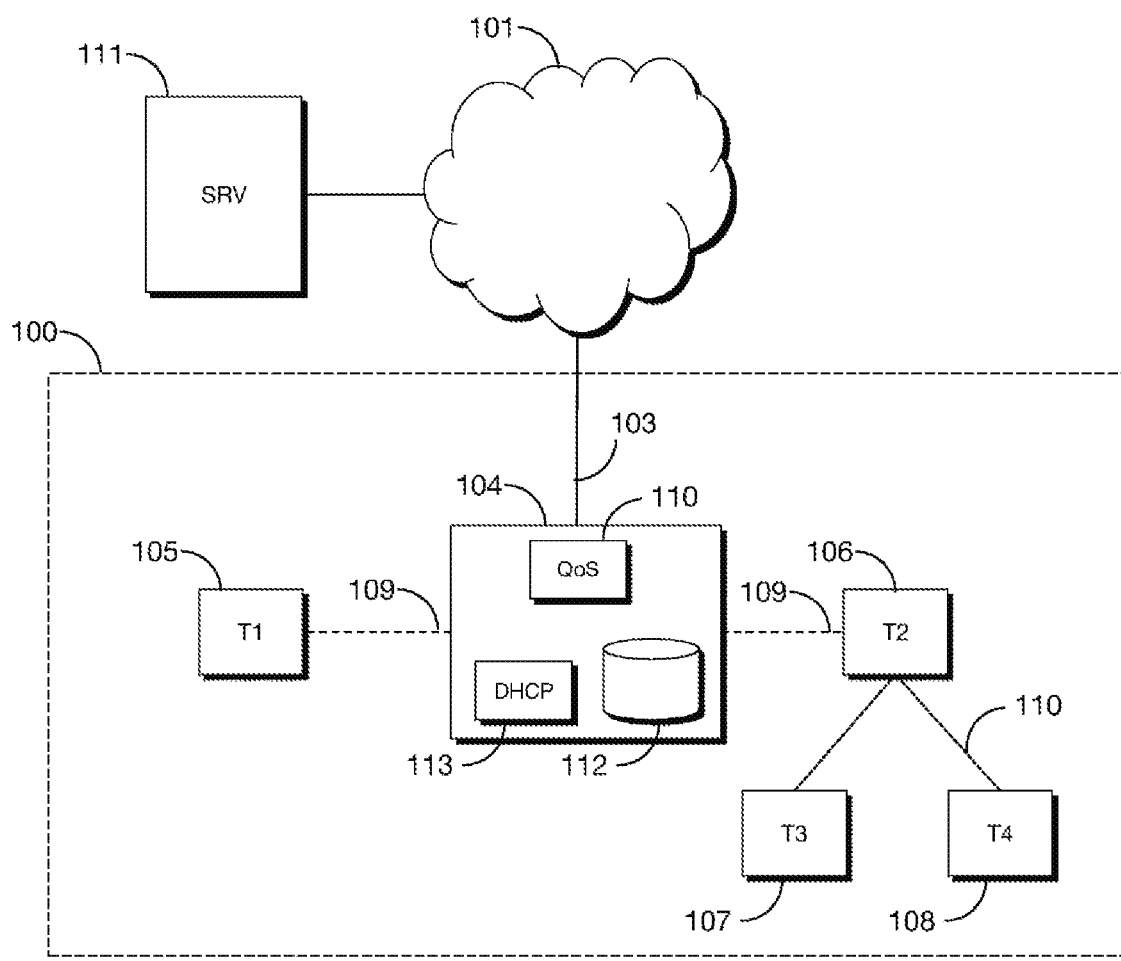

cessing the packet according to the setting associated with the destination address of the message. The invention correspondingly relates to a method for negotiating a quality of service on a terminal.

18 Claims, 5 Drawing Sheets

(56) References Cited

U.S. PATENT DOCUMENTS

| | | | |
|---|---|---|---|
| 6,876,667 B1* | 4/2005 | Synnestvedt | H04L 12/2801 370/352 |
| 8,229,888 B1* | 7/2012 | Roskind | H04N 21/25808 707/621 |
| 8,718,596 B1* | 5/2014 | Xue | H04W 64/00 455/404.2 |
| 2005/0148342 A1* | 7/2005 | Sylvain | H04L 67/18 455/456.3 |
| 2007/0025337 A1* | 2/2007 | Polk | H04L 67/16 370/352 |
| 2007/0082677 A1* | 4/2007 | Hart | H04W 16/18 455/456.1 |
| 2008/0232801 A1* | 9/2008 | Arnold | H04Q 11/0067 398/58 |
| 2008/0279116 A1* | 11/2008 | Tuffin | H04L 67/306 370/254 |
| 2008/0294891 A1* | 11/2008 | Ram Ov | H04W 12/069 713/158 |
| 2009/0003330 A1* | 1/2009 | Li | H04L 61/2015 370/389 |
| 2009/0005066 A1* | 1/2009 | Florkey | H04L 61/2015 455/456.1 |
| 2009/0034536 A1* | 2/2009 | Morand | H04L 67/2804 370/400 |
| 2010/0121946 A1* | 5/2010 | Claes | H04L 29/12952 709/223 |
| 2011/0072120 A1* | 3/2011 | Guo | H04L 61/2015 709/222 |
| 2012/0011230 A1* | 1/2012 | Moreman | H04L 61/2015 709/220 |
| 2013/0107706 A1* | 5/2013 | Raleigh | H04L 41/5054 370/230 |
| 2013/0155965 A1* | 6/2013 | Koodli | H04W 4/021 370/329 |
| 2014/0010150 A1* | 1/2014 | Agarwal | H04L 67/16 370/328 |
| 2014/0082162 A1* | 3/2014 | Thyni | H04L 41/5054 709/220 |
| 2014/0115142 A1* | 4/2014 | Peng | H04L 61/2015 709/223 |
| 2014/0185536 A1* | 7/2014 | Lynn, Jr. | H04W 40/32 370/329 |
| 2014/0254471 A1* | 9/2014 | Fang | H04W 84/047 370/315 |
| 2015/0117458 A1* | 4/2015 | Gurkan | H04L 49/25 370/392 |
| 2015/0189557 A1* | 7/2015 | Touati | H04W 48/16 370/332 |
| 2015/0350912 A1* | 12/2015 | Head | H04W 12/08 726/4 |
| 2016/0014072 A1* | 1/2016 | Mongazon-Cazavet | H04L 47/825 709/226 |
| 2018/0007125 A1* | 1/2018 | Onno | G06F 9/5083 |
| 2018/0232801 A1* | 8/2018 | Sud | G06Q 30/0645 |
| 2020/0186439 A1* | 6/2020 | Bouvet | H04L 41/0806 |

OTHER PUBLICATIONS

The International Search Report for the International Application No. PCT/FR2017/052791.

* cited by examiner

| GW IP | Config | Param |
|---|---|---|
| 192.168.1.254 | « best effort » | NAT1, DSCP1, FW1 |
| 192.168.1.255 | « medium » | NAT2, DSCP2, FW2 |
| 192.168.1.256 | « real-time » | NAT3, DSCP3, FW3 |

*Figure 3*

METHOD FOR NEGOTIATING A QUALITY OF SERVICE OFFERED BY A GATEWAY TO TERMINALS

TECHNICAL FIELD

The application for invention lies in the field of telecommunications, and more particularly in the field of network access points, such as home gateways.

PRIOR ART

Connected objects are characterized by their ability to connect to a telecommunications network in order to exchange data with other equipments. These may be for example connected scales, a household equipment, a bracelet or even toys. Such objects are currently experiencing strong growth. These connected objects may either use a direct connection to a network access point or use an indirect connection through an intermediate equipment, which itself manages one or more other access technologies.

The connection to the access point may be performed via a wired connection or else via a wireless connection, such as a Wi-Fi or Bluetooth connection.

As is conventional, an address is assigned to such equipments during a phase of attaching the object to the network. To this end, the network access point assigns a private IP (Internet Protocol) address to the connected objects, which is achieved by way of the DHCP (Dynamic Host Configuration Protocol) protocol.

When assigning an IP address to a terminal, the DHCP protocol may also provide the terminals with a "default" IP address and the address of a DNS (Domain Name Server) server. These addresses are generally private addresses allowing the gateway to intercept and/or to relay the messages transmitted by the terminals to other equipments.

The connected objects may be of any type and may communicate with service platforms that are completely independent of the telecoms operator in charge of the network access point.

Some connected objects, depending on their application, may require a differentiated quality of service. For example, an object implementing a Voice over IP service does not have the same traffic characteristics or the same network requirements as electronic scales. Some types of object or terminal may thus require a particular configuration of the NAT (network address translation) of the gateway or of the firewall, or else particular marking of the outgoing packets.

Now, home gateways generally offer just a single setting for the terminals and devices of the local area network and operate in a "best effort" mode without drawing a distinction between the terminals.

There is therefore a need to adapt the quality of service depending on the specific needs of the various terminals and connected objects of a local area network.

SUMMARY OF THE INVENTION

To this end, the invention relates to a method for configuring a quality of service by way of a gateway including an interface on a local area network and an interface on a wide area network for a terminal of the local area network to access the wide area network, following the reception, by the gateway, of a network discovery message transmitted by the terminal, the method being noteworthy in that it comprises the following steps:

associating at least one address of the gateway on the local area network with a particular quality of service setting of the gateway, sending a network attachment offer message to the terminal, the message comprising at least one address of the gateway associated with a particular setting of the quality of service, and upon reception of a message from the terminal and destined for an address of the gateway, processing the packet according to the setting associated with the destination address of the message.

The method thus proposes to associate one or more IP addresses of the gateway on its LAN interface with various settings of the gateway corresponding to various qualities of service. Thus, the packets received by the gateway via a particular IP address are processed with a particular quality of service. In this way, the gateway is able to offer a particular quality of service to a terminal by communicating to it a particular gateway address. In this way, the data packets addressed to a first default gateway address will be processed according to a first quality of service setting, whereas data packets addressed to a second default gateway address will be processed according to a second quality of service setting, different from the first setting. The default gateway addresses communicated to the terminals may respectively correspond to different hardware network interfaces on the gateway. These may also be virtual interfaces configured on a single hardware network interface of the gateway. For example, these may be a first and a second hardware Ethernet interface or a first and a second private IP address that are associated with one and the same hardware interface. The traffic from this terminal will then be processed by the gateway according to the setting associated with the gateway address used by the terminal. The terminal is thus able to benefit from a differentiated quality of service.

In the context of the invention, a gateway corresponds to an equipment for interconnection between a local area network (LAN) and a wide area network (WAN). This is for example an access point, such as for example a hotspot access point, an access point to a cellular network or else a home gateway, or a router modem offering Ethernet or Wi-Fi connectivity to terminals of a local area network. As is conventional, such equipments have a LAN network interface implementing a private address plan and one or more WAN interfaces having a public address. This type of gateway generally has a firewall aimed at protecting the terminals of the local area network, an address translation module, such as an NAT (network address translation), or else a traffic prioritization module. Such an equipment furthermore comprises a DHCP (Dynamic Host Configuration Protocol) server whose role is to communicate configuration information to the terminals when they attach to the local area network. For example, the DHCP server may transmit a configuration comprising an IP (Internet Protocol) address assigned to the terminal, a subnetwork mask, the address of a default gateway to which the terminals should direct their outgoing traffic. The WAN interface is generally associated with a DHCP client configured so as to receive configuration information from a DHCP server of the network, and in particular so as to receive a public IP address assigned by the operator of the WAN network, a subnetwork mask and a default router address. The gateway thus makes it possible to relay data packets between the terminals of the LAN and servers of the WAN.

According to one particular embodiment, the configuration method is such that the received discovery message comprises at least one indication of quality of service requested by the terminal.

A terminal or a connected object may thus request a particular quality of service when it attaches to the access point. Such an indication may be contained for example in a field of a message requesting attachment of the terminal to the network.

According to one particular embodiment, the method is such that the attachment offer message contains a gateway address selected depending on the quality of service requested by the terminal.

The attachment offer message received by the terminal comprises an IP address of a gateway selected according to the quality of service indication contained in the discovery message transmitted by the terminal. Thus, the traffic transmitted by the terminal to this address will be processed by the gateway with the quality of service desired by the terminal.

According to one particular embodiment, the method is such that the discovery message is a DISCOVER message in accordance with the DHCP protocol and that the attachment offer message is an OFFER message in accordance with the DHCP protocol.

The use of a protocol implemented by a large majority of terminals for transmitting data for configuring a particular quality of service advantageously makes it possible to implement the invention without it being necessary to adapt the fleet of terminals and connected objects that are already deployed.

According to one particular implementation, the method is such that the quality of service setting comprises a particular NAT configuration.

Address translation (or NAT, for network address translation) is a technique that is conventionally implemented on network gateways aimed at translating private addresses assigned to equipments of a local area network (LAN) into public addresses able to be used on the WAN (wide area network) interface of the gateway. To this end, NAT keeps associations between addresses of terminals and communication ports assigned on the local area network with public ports and addresses on the WAN interface. This association is kept by the gateway for a limited time. In order that data packets received on the WAN interface are able to be routed to the correct terminal via the LAN interface, the association has to be active. To keep this association active, the terminals have to regularly transmit data packets. The connected objects thus have to keep the configuration of the NAT active by using various techniques that are broadly based on generating traffic before the end of the lifetime of the association in the NAT.

In this way, the gateway is able to configure different NAT rules according to the terminal that attaches to the access point.

According to one particular embodiment, the method is noteworthy in that the quality of service setting comprises a particular configuration of the IP protocol on the interface to the wide area network of the gateway.

In general, all of the applications, terminals and connected objects linked to the LAN interface of the network access point have "best effort" quality. The uplink traffic from the LAN is queued in the router of the network access point, and this traffic is transmitted on the WAN in the order of arrival of the packets in the queue. However, some services could require differentiated processing, for example real-time VoIP (Voice over IP) applications, for which the sending of the VoIP packets to the network could be processed as a priority over other data packets queued in the router. The method makes it possible for example to associate a default address on the LAN side with a strategy for marking the outgoing packets, for example in accordance with the DSCP (Differentiated Services Code Point) protocol, so that they benefit from improved processing in the routers used on the network in the uplink direction.

According to one particular embodiment, the method is such that the quality of service setting comprises a specific configuration of the firewall.

The use of a firewall in a home gateway may for example impact the correct operation of some services, terminals or objects connected to the local area network. Some applications then require a particular configuration of the firewall so as for example to authorize the incoming traffic on a particular port. The method according to the invention advantageously makes it possible to communicate, to a particular terminal, a default gateway address associated with a particular setting of the firewall, without impeding the operation of other terminals or services.

According to one particular embodiment, the method is such that the quality of service setting comprises selecting one particular interface from among a plurality of interfaces to wide area networks.

A home gateway or a network access point may have a plurality of WAN connections. For example, an access point may have an ADSL (asymmetric digital subscriber line) interface and an interface to a 4G cellular network. In such a case, the method makes it possible to associate a local IP address on the LAN interface with a particular WAN interface, such that the data packets received on a particular gateway private address are routed to a particular WAN interface.

According to another aspect, and corresponding to the configuration method described above, the invention relates to a method for negotiating a quality of service offered by a gateway for a terminal to access a communication network following the transmission, by the terminal, of a network discovery message, the method being characterized in that it comprises the following steps:

receiving a network attachment offer message, the message comprising at least one gateway address, said address being associated, on the gateway, with a particular quality of service setting.

A terminal or a connected object thus receives, in a message offering attachment to a network, the address of a gateway to which to transmit its outgoing traffic. This address is associated, on the gateway, with a particular setting of the quality of service. In this way, the terminal or the connected object is able to benefit from a setting different from the other terminals.

According to one particular embodiment, the negotiation method is noteworthy in that the transmitted discovery message comprises at least one indication of quality of service requested by the terminal.

The terminal is thus able to communicate with a home gateway or an access point implementing the method for configuring a quality of service adapted to its needs.

According to one particular embodiment, the negotiation method is such that at least one gateway address contained in the received attachment offer message is selected by the gateway depending on the at least one indication of quality of service requested by the terminal.

The terminal or the communicating object thus receives, in an attachment offer message, an address of a default gateway to which to transmit data packets. This address is noteworthy in that it is associated with a particular setting of the home gateway or of the access point, said setting implementing a quality of service corresponding to the quality of service requested in the discovery message transmitted beforehand by the terminal. The terminal is thus able to have a quality of service adapted to its needs, independently of the quality of service offered by the gateway to other terminals.

According to one particular embodiment, the method is noteworthy in that the discovery message is a DISCOVER message in accordance with the DHCP protocol and that the attachment offer message is an OFFER message in accordance with the DHCP protocol.

A terminal is thus able to communicate a desired quality of service and receive a default gateway address to which to route its outgoing traffic, so as to obtain the requested quality of service while implementing an existing protocol. Such a provision facilitates the deployment of the method.

According to one particular implementation of the invention, the negotiation method is noteworthy in that the quality of service setting comprises a particular NAT configuration.

The method thus makes it possible to associate a particular configuration of the NAT with a default gateway address, such that the terminals configured with this address are able to benefit from this configuration without other terminals configured with a different default gateway address being concerned by this configuration.

According to one particular embodiment, the negotiation method is such that the quality of service setting comprises a particular configuration of the IP protocol on the interface to the wide area network of the gateway.

In general, all of the applications, terminals and connected objects linked to the LAN interface of the network access point have "best effort" quality. The uplink traffic from the LAN is queued in the router of the network access point, and this traffic is transmitted on the WAN in the order of arrival of the packets in the queue. However, some services could require differentiated processing, for example real-time VoIP (Voice over IP) applications, for which the sending of the VoIP packets to the network could be processed as a priority over other data packets queued in the router. The method makes it possible for example to associate a default address on the LAN side with a strategy for marking the outgoing packets, for example in accordance with the DSCP (Differentiated Services Code Point) protocol, so that they benefit from improved processing in the routers used on the network in the uplink direction.

According to one particular embodiment, the negotiation method is such that the quality of service setting comprises a specific configuration of the firewall.

The use of a firewall in a home gateway may for example impact the correct operation of some services, terminals or objects connected to the local area network. Some applications then require a particular configuration of the firewall so as for example to authorize the incoming traffic on a particular port. The method according to the invention advantageously makes it possible to communicate, to a particular terminal, a default gateway address associated with a particular setting of the firewall, without impeding the operation of other terminals or services.

According to one particular embodiment, the negotiation method is such that the quality of service setting comprises selecting one particular interface from among a plurality of interfaces of the gateway to wide area networks.

A home gateway or a network access point may have a plurality of WAN connections. For example, an access point may have an ADSL (asymmetric digital subscriber line) interface and an interface to a 4G cellular network. In such a case, the negotiation method makes it possible to associate a local IP address on the LAN interface with a particular WAN interface, such that the data packets transmitted by the terminal to this private address of the gateway are routed to a particular WAN interface.

According to another aspect, the invention relates to a device for configuring a quality of service for a terminal to access a communication network following the reception, by the device, of a network discovery message transmitted by the terminal, the device being characterized in that it comprises:
  a memory designed to store at least one association between an address of the gateway on the local area network and a particular quality of service setting of the gateway,
  a communication interface designed to send a network attachment offer message to the terminal, the message comprising the at least one default gateway address, and
  communication means designed to receive at least one message from the terminal and destined for the default gateway address, processing the packet according to the setting associated with the default gateway address.

According to yet another aspect, and corresponding to the configuration device described above, the invention relates to a device for negotiating a quality of service offered by a home gateway for accessing a communication network following the transmission, by the device, of a network discovery message, the device being characterized in that it comprises:
  a communication interface designed to receive a network attachment offer message, the message comprising at least one default gateway address associated with a particular quality of service setting on the gateway, and
  a communication interface designed to transmit data packets to the default gateway address contained in the network attachment message.

The invention furthermore relates to a home gateway including a configuration device such as described above, and to a terminal or a connected object including a negotiation device such as described above.

In one particular embodiment, the various steps of the methods according to the invention are determined by computer program instructions.

As a result, the invention also targets a computer program including instructions for executing the steps of the configuration method and/or of the negotiation method when said program is executed by a processor.

Such a program may use any programming language, and be in the form of source code, object code, or of intermediate code between source code and object code, such as in a partially compiled form, or in any other desirable form.

The invention relates lastly to an information medium able to be read by a processor and on which there is recorded a computer program comprising instructions for executing the steps of the configuration and/or negotiation method.

The information medium may be any entity or device capable of storing the program. For example, the medium may include a storage means, such as a ROM, for example a CD-ROM or a microelectronic circuit ROM, or else a magnetic recording means, for example a floppy disk or a hard disk. Moreover, the information medium may be a transmissible medium such as an electrical or optical signal, which may be routed via an electrical or optical cable, by radio or by other means. The program according to the invention may in particular be downloaded from an Internet network. As an alternative, the information medium may be an integrated circuit in which the program is incorporated, the circuit being designed to execute or to be used in the execution of the method in question.

The various aforementioned embodiments or implementation features may be added, independently or in combination with one another, to the steps of the rendering method as defined above.

The terminals, gateways, devices and programs have at least advantages analogous to those conferred by the rendering method described above.

LIST OF THE FIGURES

Figure 2:
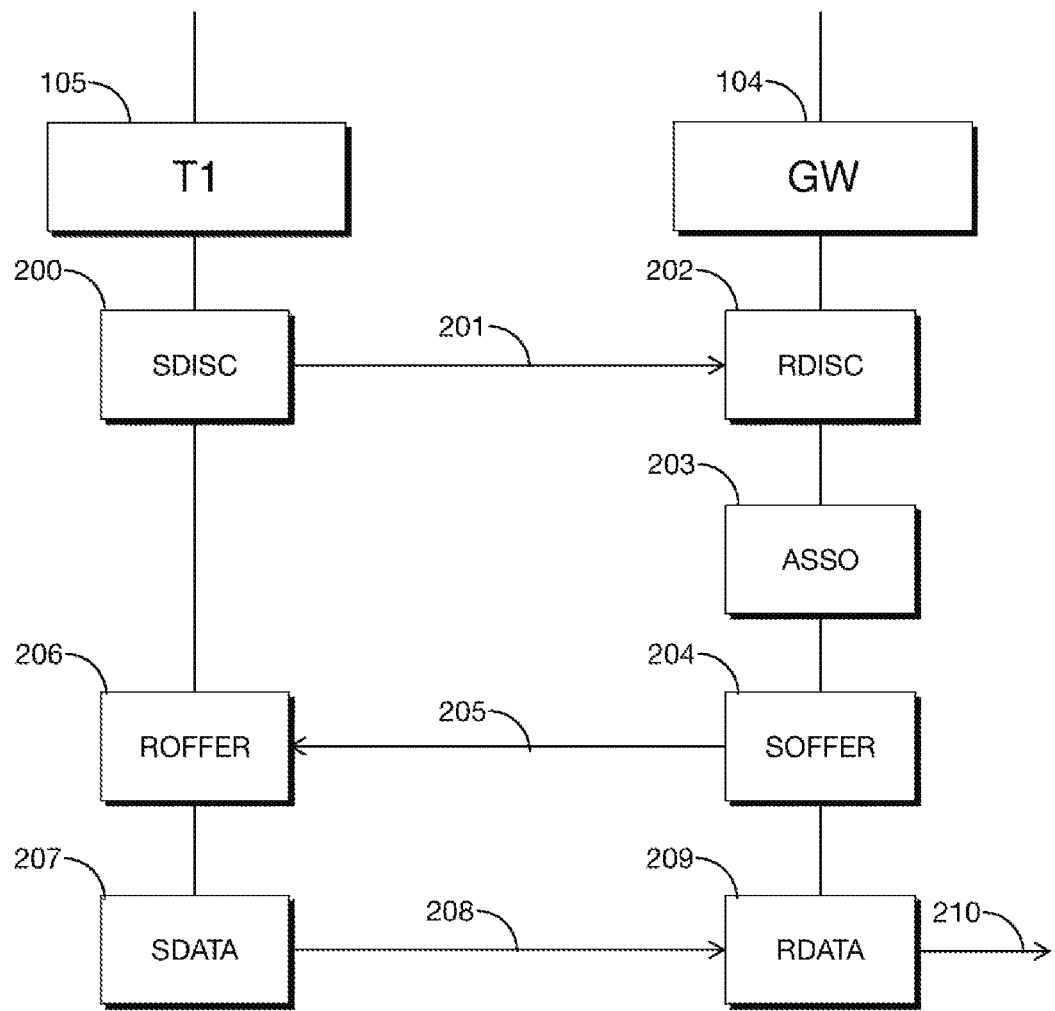
Figure 4:
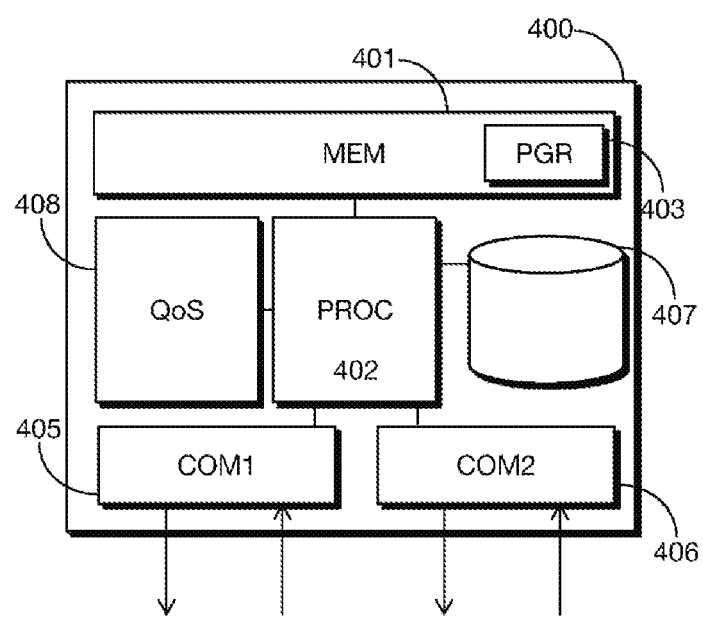
Figure 5:
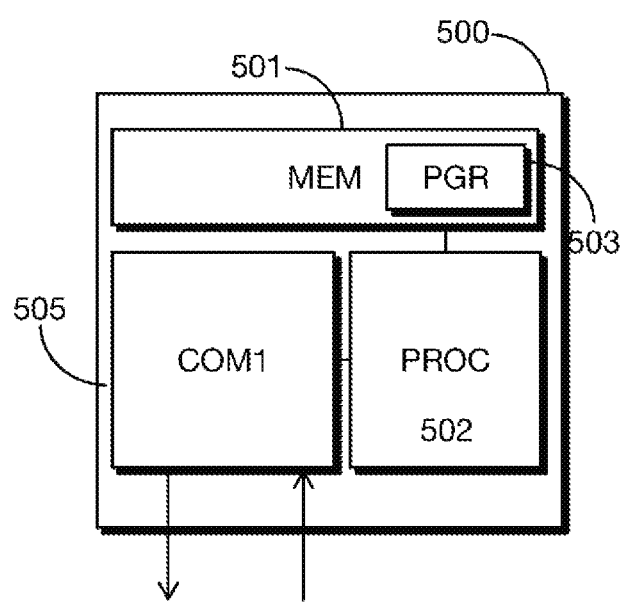

Other features and advantages of the invention will become more clearly apparent from reading the following description of one particular embodiment, given by way of simple illustrative and nonlimiting example, and the appended drawings, in which:

FIG. 1 illustrates a network architecture suitable for implementing the invention, according to one particular embodiment, FIG. 2 shows the various steps of the negotiation and configuration methods, as well as messages that are exchanged, according to one particular embodiment, FIG. 3 illustrates an exemplary table of a database designed to store an association between gateway addresses and a particular quality of service, FIG. 4 shows the architecture of a configuration device according to one particular embodiment of the invention, and FIG. 5 shows the architecture of a negotiation device according to one particular embodiment.

DETAILED DESCRIPTION

FIG. 1 illustrates a network architecture suitable for implementing the invention, according to one particular embodiment, What is seen is a local area network 100 connected to an Internet network 101 by way of a WAN connection 103 and a gateway 104, such as for example a home gateway, a router modem or any other type of access point allowing interconnection of the local area network and a WAN network. The connection 103 is for example an ADSL or fiber-optic connection.

The gateway 104 comprises an address assignment server 113, such as a DHCP server. In this way, the gateway is able to assign IP addresses to terminals 105 and 106 of the local area network 100. Such terminals may use a wired or wireless connection 109 of Ethernet or else Wi-Fi type to communicate with the gateway 104. The terminal 106 is for example an intermediate equipment configured so as to allow the connection of terminals 107 and 108 having communication means that are not supported by the gateway 104, such as for example proprietary or excessively specific protocols. The gateway 104 comprises a quality of service (QoS) management module. Such a module may act on various components of the gateway so as to adjust the quality of service. For example, the module 110 may apply a particular configuration of the NAT, configure particular firewall rules or else for example mark packets in accordance with a service differentiation protocol such as DiffServ or DSCP, or else select one WAN interface from among a plurality of available WAN interfaces or else segment/assemble packets in order to adapt to the features of the selected WAN interface, for example in order to adapt to the MTU (maximum transmission unit) and/or MSS (maximum segment size) parameters configured/negotiated on the WAN interface, or else to specifically configure the IP protocol stack of the WAN interface. In this way, the terminals and connected objects of the local area network 100 are able to access online services, such as for example the service 111, with a quality of service corresponding to the configuration implemented by the module 110.

The gateway 104 furthermore comprises a memory, such as for example a database 112 designed to store a configuration of the module 110.

As is known, when a terminal such as the terminal 105 wishes to connect to an access point, it transmits a DHCP DISCOVER message in broadcast mode. By way of this message, a terminal is able to ask an access point or a gateway to transmit certain parameters to it, such as for example an IP address, a subnetwork mask, the address of a default gateway or any other parameter. In particular, the DHCP protocol allows a terminal to request non-standard parameters without affecting the operation of a DHCP server that is not in charge of these parameters.

The main steps of the negotiation and configuration methods will now be described with reference to FIG. 2.

A DHCP DISCOVER message 201 is transmitted by the terminal 105 in step 200. Such a message may be transmitted when the terminal 105 initially attaches to the network 107. The message contains parameter requests, and in particular an IP address, a subnetwork mask and a default gateway address.

According to one particular embodiment of the invention, the DHCP DISCOVER message comprises at least one indication of quality of service requested by the terminal. This request may advantageously be indicated in the "Parameter Request List" field of the DHCP DISCOVER message by way of a predetermined parameter identifier.

According to one particular implementation, the DHCP DISCOVER message comprises an indication according to which a list of qualities of service available on the gateway is requested. This request may be formulated by way of the "Parameter Request List" field.

According to one particular embodiment, in step 203, the gateway searches for an association between a default gateway address able to be used on the local area network and a quality of service configuration. Such associations are stored for example in a database of the gateway 104, such as for example in the database 112. As a variant, only the various quality of service configurations are stored in the database, and the gateway dynamically associates a default gateway address with a particular configuration of the quality of service. The particular configuration may for example be selected according to an identifier of the terminal transmitted in the discovery message.

Such parameters for configuring a quality of service may comprise a particular setting of a firewall, of an NAT or marking of the data packets transmitted on the WAN. Particular parameters may thus be applied to all of the packets received on a LAN IP address of the gateway associated with these parameters. For example, FIG. 3 illustrates a table that may be stored in the database 112 so as to keep such associations. The table comprises a first column containing default gateway IP addresses, the second column optionally comprises a configuration name, which may serve for example to identify a quality of service configuration on the basis of a name contained in a received DHCP DISCOVER message, and a third column containing a particular setting of various modules designed to implement the quality of service associated with the IP address in the first column.

According to one particular implementation, in which the DHCP DISCOVER message comprises a requested quality of service indication, the gateway searches in the database 112, using a suitable SQL (Simple Query Language) request, for a default gateway address associated with a quality of service configuration corresponding to the quality of service requested by the terminal.

In step 204, the gateway transmits a response to the attachment request received in step 202. This is for example a DHCP OFFER response 205. According to the invention, the response comprises a default gateway IP address, the address being associated with a particular quality of service configuration, as identified in step 203. According to one particular implementation, the IP address of the default gateway is associated with a quality of service configuration corresponding to the indication of quality of service requested in the DHCP DISCOVER message 201.

In step 206, the terminal thus obtains a default gateway address, noteworthy in that the packets received by the gateway on this default address are processed by said gateway according to the parameters of the quality of service configuration associated with the default gateway address and stored in the database 112.

In step 207, the terminal transmits data packets 208 to the default gateway address received in the message 205 and associated with a particular quality of service.

Thus, when the gateway 104 receives the data packets in step 209 on the default address communicated to the terminal, the packets are processed according to the quality of service parameters associated with the address on which the packets are received, before being relayed on the WAN interface of the gateway by way of messages 210. In this way, the method allows terminals to negotiate a particular quality of service, adapted to their needs, and separate from the quality of service offered to other terminals.

According to one particular embodiment, the DHCP DISCOVER message 201 comprises an indication according to which a list of the available qualities of service is requested. In such a case, the DHCP OFFER message 205 transmitted by the gateway 104 in step 204 comprises a list of qualities of service that are supported. According to one preferred variant, the DHCP OFFER message comprises a list of default gateway addresses, each of the addresses being associated with a particular quality of service.

According to one particular implementation, the order in which the various default gateway addresses are listed is representative of the associated quality of service. For example, the first default gateway address listed in the DHCP OFFER message corresponds to the "best effort" quality of service, the second listed address to the "average" quality of service, and the third listed address to the "real-time" quality of service. In this way, a terminal is able to select the default address that corresponds to the quality that it requires.

FIG. 4 illustrates the architecture of a device designed to implement the configuration method. The device comprises a storage space 401, for example a memory MEM, and a processing unit 402 equipped for example with a processor PROC. The processing unit may be driven by a program 403, for example a computer program PGR, implementing the configuration method as described in the invention with reference to FIG. 2, and in particular the steps of receiving, by the gateway, a network discovery message transmitted by the terminal, of associating at least one default gateway address with a particular quality of service setting of the gateway, of sending a network attachment offer message to the terminal, the message comprising the at least one default gateway address, and, upon reception of a message from the terminal and destined for the default gateway address, processing the packet according to the setting associated with the default gateway address.

On startup, the instructions of the computer program 403 are for example loaded into a RAM memory (random access memory), before being executed by the processor of the processing unit 402. The processor of the processing unit 402 implements the steps of the configuration method according to the instructions of the computer program 403.

To this end, the device includes an interface 405 (COM1) to a LAN local area communication network. This may be an Ethernet or Wi-Fi interface, for example. The interface 405 is designed to exchange data with other devices, and in particular with a terminal of the local area network. The interface is in particular designed to receive a DHCP DISCOVER message transmitted by a terminal of the local area network. According to one particular implementation, the interface is designed to receive a DHCP DISCOVER message comprising an indication according to which a particular quality of service is requested and/or an indication according to which a list of the qualities of service supported by the device is requested. The communication interface 405 is also designed to transmit data to terminals of the local area network, and in particular to send DHCP OFFER messages comprising at least one default gateway address.

The device 400 furthermore comprises a memory 407 designed to store at least one association between a default gateway address and a quality of service setting. This is for example a database or a persistent memory, such as a flash memory.

The device 400 also comprises means 408 for processing the packets received on a default gateway address of the LAN interface according to the setting associated with the default gateway address. These processing means are for example implemented by a processor designed to execute instructions of a computer program configured so as to carry out a request in the database 407 so as to search for a setting associated with a default gateway address, and implement this setting for the packets received on said default gateway address. Implementing the setting may consist in configuring a firewall, an NAT or a module for marking the packets transmitted on the WAN interface of the gateway.

The configuration device may be integrated into network access points, such as home gateways, Wi-Fi hotspot access points, USB keys giving access to 2G/3G/4G cellular networks, or else into mobile terminals that are able to be used as an access point.

FIG. 5 illustrates the architecture of a device 500 designed to implement the negotiation method. The device comprises a storage space 501, for example a memory MEM, and a processing unit 502 equipped for example with a processor PROC. The processing unit may be driven by a program 503, for example a computer program PGR, implementing the negotiation method as described in the invention with reference to FIG. 2, and in particular the steps of transmitting, by way of the terminal, a network discovery message, and of receiving a network attachment offer message, the message comprising at least one default gateway address associated with a particular quality of service setting.

On startup, the instructions of the computer program 503 are for example loaded into a RAM memory (random access memory), before being executed by the processor of the processing unit 502. The processor of the processing unit 502 implements the steps of the negotiation method according to the instructions of the computer program 503.

To this end, the device includes an interface 505 (COM1) to a LAN local area communication network. This may be an Ethernet or Wi-Fi interface, for example. The interface 505 is designed to exchange data with other devices, and in particular with a gateway of the local area network allowing access to a WAN network. The interface 505 is in particular designed to transmit a network discovery message, such as a DHCP DISCOVER message. According to one particular implementation, the interface is designed to transmit a network discovery message containing an indication according to which a particular quality of service is requested and/or an indication according to which a list of the qualities of service supported by the gateway is requested.

The interface 505 is also designed to receive a network attachment offer message, such as a DHCP OFFER message, from a gateway, the message comprising at least one default gateway address such that the address is associated with a particular quality of service implemented on the gateway. According to one particular embodiment, the interface is designed to receive an attachment offer message containing a plurality of default gateway addresses, each of the addresses being associated with a particular quality of service on the gateway, the order of the addresses listed in the message being representative of the quality of service offered by the gateway to messages received on each of the default gateway addresses.

The interface 505 is lastly designed to transmit data packets to a default gateway address received in a network attachment offer message and being associated with a particular quality of service. To this end, the device may implement a configuration module designed to configure a network interface with the default gateway address received in a DHCP OFFER message.

The negotiation device may be integrated into mobile or fixed terminals, tablets, or else into connected objects.

The invention claimed is:

1. A method, implemented by way of an interconnection device between a local area network and a wide area network, the method comprising:
   receiving, on a first interface with said local area network, a network discovery message from a terminal of the local area network, said received discovery message comprising at least one requested quality of service indication;
   sending a network attachment offer message to the terminal, the network attachment offer message comprising at least one address of said interconnection device on said local area network, said at least one interconnection device address being associated with at least one of a plurality of quality of service settings of the interconnection device for accessing said wide area network, said at least one of said interconnection device address depending on said requested quality of service; and
   upon receiving at least one data packet from the terminal, said at least one data packet being destined to one of said at least one address of the interconnection device, processing the at least one data packet according to the quality of service setting associated with the one of said at least one address of the interconnection device.

2. The method as claimed in claim 1, wherein the discovery message is a DISCOVER message in accordance with the DHCP protocol and wherein the attachment offer message is an OFFER message in accordance with the DHCP protocol.

3. The method as claimed in claim 1, wherein the associated quality of service setting comprises a configuration of an IP protocol on a second interface of the interconnection device to the wide area network.

4. The method as claimed in claim 1, wherein the associated quality of service setting comprises selection of a second interface from among a plurality of interfaces to wide area networks of said interconnection device.

5. A method implemented by a terminal of a Local Area Network, comprising:
   transmitting a network discovery message on said Local Area Network, said network discovery message comprising at least one requested quality of service indication;
   receiving a network attachment offer message from an interconnection device interconnecting said local area network and a wide area network, the network attachment offer message comprising at least address of said interconnection device on said Local Area Network, said address being associated with at least one quality of service setting for accessing said wide area communication network via said interconnection device, said at least one interconnection device address depending on said at least one requested quality of service; and
   transmitting at least one data packet to at least one of said at least one address of the interconnection device contained in the network attachment offer message.

6. The method as claimed in claim 5, wherein the network discovery message is a DISCOVER message in accordance with the DHCP protocol and wherein the network attachment offer message is an OFFER message in accordance with the DHCP protocol.

7. The method as claimed in claim 5, wherein the associated quality of service setting comprises a first configuration of an IP protocol on an interface to the wide area network of the interconnection device.

8. The method as claimed in claim 5, wherein the associated quality of service setting comprises a selection of an interface from among a plurality of interfaces of the interconnection device to wide area networks.

9. A communication device comprising:
   at least one first communication interface with a local area network, said at least one first communication interface being designed to receive a network discovery message from a terminal of the local area network, said network discovery message comprising at least one requested quality of service indication, and to send a network attachment offer message to the terminal, the network attachment offer message comprising at least one address of the communication device on said local area network, said at least one communication device address being associated with at least one of a plurality of quality of service settings of the communication device for accessing said wide area network, said at least one communication device address depending on said at least one requested quality of service; and
   communication means designed to receive at least one data packet from the terminal, the least one data packet being destined to one of said at least one address of the communication device,
   processing means designed to process the received data packet according to the quality of service setting associated with the one of said at least one address of the communication device.

10. An interconnection device including a communication device as claimed in claim 9.

11. The communication device as claimed in claim 9, wherein the discovery message is a DISCOVER message in accordance with the DHCP protocol and wherein the attachment offer message is an OFFER message in accordance with the DHCP protocol.

12. The communication device as claimed in claim 9, wherein the associated quality of service setting comprises a configuration of an IP protocol on a second interface of the interconnection device to the wide area network.

13. The communication device as claimed in claim 9, wherein the associated quality of service setting comprises selection of a second interface from among a plurality of interfaces to wide area networks of said interconnection device.

14. A communication device comprising:
at least one communication interface to a local area network, said at least one communication interface being designed to transmit a network discovery message on said Local Area Network, said discovery message comprising at least one requested quality of service indication, and to receive a network attachment offer message from an interconnection device interconnecting said local area network and a wide area network, the network attachment offer message comprising at least one address of said interconnection device on said local rea network, said address being associated with at least one quality of service setting for accessing said wide area communication network via said interconnection device, said at least interconnection device address depending on said requested quality of service; and
a communication interface designed to transmit at least one data packet to at least one address of the interconnection device, contained in the network attachment offer message.

15. A terminal including a communication device as claimed in claim claim 14.

16. The communication device as claimed in claim 14, wherein the discovery message is a DISCOVER message in accordance with the DHCP protocol and wherein the attachment offer message is an OFFER message in accordance with the DHCP protocol.

17. The communication device as claimed in claim 14, wherein the associated quality of service setting comprises a configuration of an IP protocol on a second interface of the interconnection device to the wide area network.

18. The communication device as claimed in claim 14, wherein the associated quality of service setting comprises selection of a second interface from among a plurality of interfaces to wide area networks of said interconnection device.

* * * * *